United States Patent
Ohnishi

(10) Patent No.: US 6,333,383 B1
(45) Date of Patent: Dec. 25, 2001

(54) NON-CRYSTALLINE POLYESTER RESIN COMPOSITION

(75) Inventor: Masaya Ohnishi, Himeji (JP)

(73) Assignee: Daicel Chemical Industries, Ltd. (JP)

( * ) Notice: Subject to any disclaimer, the term of this patent is extended or adjusted under 35 U.S.C. 154(b) by 0 days.

(21) Appl. No.: 09/583,860

(22) Filed: Jun. 1, 2000

(30) Foreign Application Priority Data

Jun. 7, 1999 (JP) .................................................. 11-158897

(51) Int. Cl.$^7$ ...................................................... C08L 67/02
(52) U.S. Cl. ........................... 525/92 F; 525/89; 525/932
(58) Field of Search .................................... 525/92 F, 89, 525/932

(56) References Cited

U.S. PATENT DOCUMENTS 5,886,099 * 3/1999 Ninokura ........................... 525/92 F

* cited by examiner

Primary Examiner—Patricia A. Short
(74) Attorney, Agent, or Firm—Nixon & Vanderhye P.C.

(57) ABSTRACT

A non-crystalline polyester resin composition of the present invention is excellent in processing properties of its molding, mechanical properties and chemical properties, in addition to its moldability, and is used in a variety of fields, which comprises 50 to 99% by weight of a non-crystalline polyester resin (component A) and 1 to 50% by weight of an epoxy-modified block copolymer (component B), total amount of the components A and B being 100, component B being obtained by epoxidation of a block copolymer (B3) comprising a polymer block (B1) containing mainly a unit based on a vinyl aromatic compound and a polymer block (B2) containing mainly a unit based on a conjugated diene compound, an epoxy equivalent of the component B being in the range of 400 to 7,500, and an absolute difference-value of the refractive index between the components A and B being 0.008 or less.

9 Claims, No Drawings

NON-CRYSTALLINE POLYESTER RESIN COMPOSITION

BACKGROUND OF THE INVENTION

1. Field of the Invention

The present invention relates to a non-crystalline polyester resin composition. More particularly, the present invention relates to a non-crystalline polyester resin composition which comprises a non-crystalline polyester resin component and an epoxy-modified block copolymer component obtained by epoxidation of unsaturated bonds in a block copolymer comprising a block polymer of a vinyl aromatic compound and a block polymer of a conjugated diene compound, the resin composition being in a specified range with respect to an epoxy-equivalent, an absolute difference value between the refractive index of each component and a mixed ratio of each component, being excellent in moldability and secondary processing properties, being improved in transparency and impact-resistance of a molding thereof and being given a balanced mechanical strength.

2. Description of the Related Arts

A non-crystalline polyester resin is excellent in processing properties of its molding, mechanical properties and chemical properties, in addition to its moldability, and is used in a variety of fields.

In more detail, the non-crystalline polyester resin is excellent in such moldability as extrusion-, injection-, hollow-, rotational-, compression-, pressure-, vacuum- and free blow-molding, and besides excellent in such mechanical processing as cutting, grinding and bending processing of a film, sheet, plate, container or the like obtained by its molding, in such adhesive processing properties as ultrasonic adhesion, heat adhesion and solvent adhesion, and in such secondary processing properties as silk printing, gravure printing and pad printing. Moreover, the above-mentioned polyester resin and the moldings thereof are excellent in a solvent resistance and an oil resistance, and accordingly are widely used for automobile parts, electronic machinery and tools, office-work appliances, or packages of medical appliance parts, various protective covers, display sheets, indoor partitions, floor materials such as a flooring, refrigerators, containers for frozen food, containers for miscellaneous goods, or the like.

Although the non-crystalline polyester resin has a weak point in transparency and impact strength of a molding thereof, recently, the non-crystalline polyester resin or its molding having an appropriate softness as well as an excellent transparency and a high impact resistance, specifically in the fields of the display sheets, indoor partitions, package films, containers, or protective covers, among the above-mentioned various fields for use, has been sought up to the present.

In general, an elastomer having a rubber-elasticity or a compatibility-enhancing agent is added, as means to solve the impact resistance and also the softness-improvement of a synthesized resin, its resin composition or a molding thereof. In almost cases as such, the molding decreases visual transparency thereof and it is impossible to satisfy impact resistance or softness with transparency at the same time. Accordingly, the above-elastomer or the compatibility-enhancing agent has not been utilized appreciably for the objects which require transparency.

In order to improve the visual transparency, it is well known that the compatibility-improvement of the resin component to be mixed with the elastomer or the like and moreover allowing each refractive index of the components to come as near as possible are effective. However, it has been, heretofore, considered impossible to find out a resin composition which has a high visual transparency in a solid phase and gives impact resistance and softness effectively.

SUMMARY OF THE INVENTION

It is, therefore, an object of the present invention to provide a non-crystalline polyester resin composition which provides a high transparency and impact resistance to the moldings, obtained by the use of a non-crystalline polyester resin used in various fields.

As the result of intensive studies to solve the above-object, the present inventor has found out that the object of the present invention can be achieved by mixing, in a specified range, a non-crystalline polyester resin component with an epoxy-modified block copolymer component having a specified range of an epoxy equivalent, obtained by epoxidation of a block copolymer comprising a block polymer of a vinyl aromatic compound and a block polymer of a conjugated diene compound, and further by limiting difference between the refractive-indexes of both components to a specified range. The present invention is based on these findings. The gist of the present invention will be described below.

The first aspect of the present invention relates to a non-crystalline polyester resin composition which comprises 50 to 99% by weight of a non-crystalline polyester resin (component A) and 1 to 50% by weight of an epoxy-modified block copolymer (component B) (total of both components being 100% by weight), obtained by epoxidation of a block copolymer (B3) comprising a block polymer (B1) containing mainly a unit based on a vinyl aromatic compound and a block polymer (B2) containing mainly a unit based on a conjugated diene compound, an epoxy equivalent of component B being in the range of 400 to 7,500 and an absolute value of refractive-index difference between both components A and B being 0.008 or less.

The second aspect of the present invention relates to a non-crystalline polyester resin composition according to the above-stated first aspect of the present invention, wherein the component B is an epoxy-modification of a hydrogenated block copolymer obtained by epoxidation of the hydrogenated block copolymer, the hydrogenated block copolymer being a partially hydrogenated block copolymer (B3).

The third aspect of the present invention relates to a non-crystalline polyester resin composition according to the above-stated first aspect of the present invention, wherein component B is a mixture of an epoxy-modification of a non-hydrogenated block copolymer obtained by epoxidation of the non-hydrogenated block copolymer (B3) and the epoxy-modification of a hydrogenated block copolymer.

The fourth aspect of the present invention relates to a non-crystalline polyester resin composition according to any one of the above-stated first to third aspects of the present invention, wherein at least one part of the vinyl aromatic compounds contained in the component B is a styrene, and a styrene amount contained in the component B being 60 to 90% by weight.

DESCRIPTION OF THE PREFERRED EMBODIMENT

In the following, the present invention will be explained in detail.

The non-crystalline polyester resin, one of the constitutional components of the non-crystalline polyester resin composition according to the present invention, in a chemical meaning, is a resin obtained by esterification of a dicarboxylic acid component with a diol component. The non-crystalline polyester resin may be exemplified by any one of (1) a copolyester resin wherein two or more kinds of compounds are used in at least one component of the dicarboxylic acid component and the diol component, (2) a mixed polyester resin wherein one kind of a homopolyester resin and the above-mentioned copolyester resin (1) are used, and (3) a mixed polyester resin wherein two or more kinds of the above-mentioned homopolyester resin are used. Namely, these are meant by the polyester resins which can produce a substantially non-crystalline molding under an ordinary molding condition. Herein, "non-crystalline" is meant by that a definite peak of melting point will not be recognized by Differential Scanning Calorimetry (DSC) measurement on the basis of JIS K7121 (a method for measuring a transition-temperature of plastics).

As the dicarboxylic acid, constituting the non-crystalline polyester resin according to the present invention, a terephthalic acid is most preferably used. Examples of the other dicarboxylic acids to be used together with the terephthalic acid include an aromatic, a chain aliphatic, or an alicyclic dicarboxylic acid such as an isophthalic acid, a naphthalene dicarboxylic acid, a cyclohexane dicarboxylic acid, a succinic acid, a sebacic acid, an adipic acid, glutaric acid and an azelaic acid. No limitation is specifically put on the molar ratio of these dicarboxylic acids to be used together with the terephthalic acid, but it is preferable to use 10 mol % or less of the dicarboxylic acid constituting the copolyester resin, in order to effectively obtain a non-crystalline polyester resin, and the terephthalic acid is most preferable in case when a single acid is to be used.

On the other hand, as the diol, constituting the non-crystalline polyester resin according to the present invention, ethylene glycol is most preferably used. As the other diols to be used together with the ethylene glycol, 1,4-cyclohexane dimethanol is representatively used, and for example, a published Japanese translation of PCT international publication for Patent Application No. 509449/1997 discloses a non-crystalline polyester resin improved by the use of 31 mol % of 1,4-cyclohexane dimethanol in the diol components.

In case where ethylene glycol and 1,4-cyclohexane dimethanol are used together as the diol component, diethylene glycol, triethylene glycol, propane diol, butane diol, pentane diol, hexane diol, tetramethylcyclobutane diol, or the like may be further employed at the same time, in a ratio of 10 mol % or less based on the total diols.

Another constitutional component of the non-crystalline polyester resin composition according to the present invention, in a meaning of chemical component, is an epoxy-modified block copolymer (B) obtained by epoxidation of a block copolymer (B3) comprising a polymer block (B1) containing mainly a unit based on a vinyl aromatic compound and a polymer block (B2) containing mainly a unit based on a conjugated diene compound. Herein, the block copolymer (B3) contains any of a non-hydrogenated one, a partially hydrogenated one (hydrogenation-ratio is preferably 1 to 99%, more preferably 1 to 90%), or a mixture of both ones.

Examples of the aromatic compound related to the polymer block (B1) include styrene, α-methylstyrene, vinyltoluene, p-tert-butylstyrene, divinylbenzene, p-methylstyrene, 1,1-diphenylstyrene and the like. One or more of these compounds may be selected to use, but styrene is most preferable above all.

Examples of the conjugated diene compound related to the polymer block (B2) include butadiene, isoprene, 1,3-pentadiene, 2,3-dimethyl-1, 3-butadiene, piperylene, 3-butyl-1, 3-octadiene, phenyl- 1, 3-butadiene and the like, and one or more of these may be selected to use.

The copolymerization-ratio (by weight) of the polymer block (B1) and the polymer block (B2) constituting the block copolymer (B3) is not particularly limited, but the range of 5:95 to 90:10 is preferable, and the range of 60:40 to 90:10 is particularly preferable.

No limitation is put on the molecular weight of the epoxy-modified block copolymer (B) according to the present invention, but the number average molecular weight is preferable in the range of 5,000 to 600,000, and 10,000 to 500,000 is particularly preferable. Moreover, no limitation is put on the molecular weight distribution of the block copolymer (B), but 10 or less of Mw/Mn, i.e., the ratio of the weight average molecular weight/number average molecular weight, is preferable.

As the block copolymer (B3) used for raw material to be subjected to epoxidation, any type of straight chain, branched, radial, or an arbitrary combination of these, in a meaning of molecular structure, may be available. For example, these are block copolymers of the vinyl aromatic compounds and the conjugated diene compounds having such structures as B1-B2, B1-B2-B1, B2-B1-B2, and B2-B1-B2-B1, and moreover, these are epoxidation-products of the double bonds in carbon-carbon bonds derived from the conjugated diene compounds.

As a method for producing the epoxy-modified block copolymer (B) according to the present invention, various measures may be adopted. In the first place, as a method for producing the block copolymer (B3), for example, according to the methods as disclosed in Patent Application Publication Nos. 23798/1965, 17979/1968, 32415/1971, and 28925/1981, it is possible to synthesize a block copolymer of a vinyl aromatic compound and a conjugated diene compound in an inactive solvent using a lithium catalyst and the like.

Further, the above-stated block copolymer of a vinyl aromatic compound and a conjugated diene compound, as occasion demands, may be partially hydrogenated, and in concrete, according to the methods as disclosed in Patent Application Publication Nos. 8704/1967 and 6636/1968, or Patent Application Laid Open No. 133203/1984, it is possible to synthesize the block copolymer of a vinyl aromatic compound and a conjugated diene compound, which is partially hydrogenated, by hydrogenating in an inactive solvent in the presence of a hydrogenating catalyst.

No particular limitation is put on the above-mentioned method for producing the epoxy-modified block copolymer (B) by epoxidation of the block copolymer (B3) containing a non-hydrogenated one, a partially hydrogenated one, or a mixture of both ones. For example, it is possible to react the block copolymer (B3), in an inactive solvent, with such epoxidation-agent as hydroperoxides, peracids and the like.

Examples of the hydroperoxides include a combined use of a mixture of a tungstic acid and sodium hydroxide with hydrogen peroxide, a combined use of an organic acid with peroxide, or a combined use of molybdenum hexacarbonyl with tert-butylhydroperoxide, and the like, and examples of the peracids include a performic acid, a peracetic acid, or a perbenzoic acid.

The amount of the epoxidation-agent used for above-mentioned epoxy-modification reaction is not particularly limited, as long as conditions in relation to an epoxy equivalent described below are satisfied, and an appropriate amount of the epoxidation-agent may be arbitrary selected to use in view of such conditions as reactivity of an epoxydation-agent to be used, a desired epoxidation degree, an amount of the unsaturated carbon bonding in a block copolymer to be subjected to an epoxy-modification or in the hydrogenated derivatives of the block copolymer.

The inactive solvent to be used in case of the epoxy-modification reaction is employed for the purpose of decreasing viscosity of a raw material block copolymer, dilution of an epoxidation-agent for its stabilization or the like. For example, in case where a peracetic acid is used as an epoxidation-agent, an aromatic compound, an ether compound, an ester compound or the like may be preferably used, and as a specifically preferable solvent, hexane, cyclohexane, toluene, benzene, ethyl acetate, carbon tetrachloride, and chloroform are exemplified.

No strict limitation is put on conditions of the above-mentioned epoxy-modification reaction. A reaction-temperature range may be suitably selected according to reactivity of an epoxydation-agent to be used, and for example, in case where a peracetic acid is used as an epoxidation agent, 0 to 70° C. is preferable. If the reaction-temperature is lower than 0° C., the reaction will be prone to slow down, and if exceeds 70° C., the decomposition of a peracetic acid will occur. In case where tert-butylhydroperoxide/molybdenumdioxide diacetylacetate, an example of hydroperoxide, is used, the reaction-temperature of 20 to 150° C. is preferable. If the reaction-temperature is lower than 20° C. or exceeds 150° C., the same tendency as in the peracetic acid will take place.

No specific operations are also required in the epoxidation-reaction, and for example, it is sufficient to agitate a mixture to be reacted for 2 to 10 hours. Isolation of the epoxy-modified block copolymer (B) obtained may be properly executed by a usual method, and for example, a method for precipitating the polymer in an inactive solvent, a method for throwing the polymer into a heated water under agitation and then distilling out the solvent, a method for directly distilling out the solvent, and the like may be included.

As to the epoxy equivalent of the epoxy-modified block copolymer (B) according to the present invention, it is required to control it to be in the range of 400 to 7,500, preferably in the range of 400 to 2,000. Herein, the epoxy equivalent is calculated by the calculation-formula as "1600/[oxirane oxygen concentration (% by weight) in the epoxy-modified block copolymer]", and is represented as a weight (g) of the epoxy-modified block copolymer based on 1 mol of the oxirane oxygen. The oxirane oxygen concentration may be obtained by titration using an acetic acid solution of hydrogen bromide.

As clear from the above-calculation formula of the epoxy equivalent, if the epoxy equivalent of the epoxy-modified block copolymer (B) becomes bigger, the oxirane oxygen concentration in the copolymer will be lowered, and if the equivalent becomes smaller to the contrary, the concentration will be higher.

If the epoxy equivalent of the epoxy-modified block copolymer (B) according to the present invention is less than 400, an elastic property of the copolymer (B) will not reveal, and if the equivalent exceeds 7,500, improved effect of the impact resistance will be insufficient even if the copolymer (B) is added to the component (A).

The refractive index value of the non-crystalline polyester resin (A component) or the epoxy modified block copolymer (B component) according to the present invention is each dependent on each chemical composition, molecular structure, and the like. A desired refractive index may be obtained by selecting a kind of the monomer or an amount thereof to be used, thus not being limited to particularly, but absolute value of the difference between the-both refractive indexes has an influence upon transparency of the resin composition moldings, and the transparency is better as the absolute value of the difference becomes smaller. Namely, it is required not to exceed 0.008 from the viewpoint of the transparency in case of the molding prepared by the use of the resin composition according to the present invention.

As a method to suppress the absolute value of the difference between each of the refractive indexes of the above-components A and B in less than 0.008 by controlling each of the refractive indexes of the both components, it can be concretely exemplified a method that comprise at first to select and determine chemical species of each components or a molecular structure to be used, and then to change only the amount ratio of the constitutional component, or to vary the degree of epoxidation of the component B.

The ratio of components A and B in the non-crystalline polyester resin composition according to the present invention is required to be in the range of 50 to 99:50 to 1 (% by weight, and total being 100% by weight), from the view point of giving a high transparency and a good impact resistance to the molding thereof.

If the component A is less than 50% by weight and the component B exceeds 50% by weight, impact strength will increase, but transparency will remarkably decrease and adhesiveness of the epoxy-modified block copolymer will also arise, thereby leading to an undesirable phenomenon that blocking will come out on the surface of molding. If the component A exceeds 99% by weight and the component B is less than 1 % by weight, transparency will not be deteriorated, but it is not desirable that an impact strength improvement will not be attained.

Further, in order to improve moldability, resistance to weather, and antistatic property of the non-crystalline polyester resin composition according to the present invention, it is possible to mix a lubricant, a mold release agent, a light stabilizer, an ultraviolet absorbent, and an antistatic agent thereto, within the range so that properties of the polyester resin composition will not be changed to a large extent.

The non-crystalline polyester resin composition according to the present invention is specifically efficiently used for an injection molding and an extrusion molding among various molding means. The resin composition, however, is also applicable to various molding means such as hollow molding, compression molding and the like, and it is possible to obtain a molding which is transparent and excellent in impact resistance.

In the following, the present invention will be described in more detail with reference to Examples and Comparative Examples, which however shall not be construed to limit the present invention thereto.

EXAMPLES 1 TO 3, COMPARATIVE EXAMPLES 1 to 4

A non-crystalline polyester resin, component A, (produced by Eastman Chemical Co., Trade Name: PET-G, and no clear melting point was recognized by DSC measurement according to the afore-mentioned JIS K7121) in which a terephthalic acid, as a dicarboxylic acid, and a mixture of ethylene glycol and 1,4-cyclohexane dimethanol, as a diol, was used each in a ratio of equivalent molar number, were sufficiently dried using a hot air dryer at 95° C. for 12 hours. A refractive index thereof is shown in Table 2.

On the other hand, an epoxy-modified block copolymer, component B, which is shown as X-, Y- and Z-type and the chemical and physical properties thereof are also shown in Table 2, was prepared. Further, difference of the refractive index between both of component A and B is shown in Table 2. Incidentally, Z-type is the one obtained by epoxidation of X-type block copolymer.

Next, the above non-crystalline polyester resin and the epoxy-modified block copolymer were homogeneously mixed in a ratio shown in Table 1 (total being 100% by weight) using a drum-type blender for 5 minutes. The mixture thus obtained was fused, kneaded and extruded at a resin temperature of 240° C. using a biaxial extruder (Toshiba Machinery Manufacturing Co., Ltd. Trade Name: TEM35), and was pelletized at the same time. A test sample was prepared with an injection-mold machine using the pellet and various physical properties were measured in accordance with the following test methods. The results obtained are shown in Table 1.

As clearly seen from comparison of Examples 1 to 3 with Comparative Examples 1 to 3 in Table 1, when X-type was used as Component B and the containing amount thereof increases, Izod Strength will increase a little, but transparency will be lowered. On the contrary, Izod Strength will be remarkably improved and transparency will not be lowered, when Z-type obtained by epoxidation of X-type is used. Moreover, from comparison of Examples 2 with Comparative Examples 4, Y-type, which has a big difference from component A in the refractive index, shows a remarkable lowering in transparency as compared with z-type.

Test Method (1) Hue: A plate type test piece 3 mm in thickness was prepared, and color measurement with respect to the test piece was conducted, through transmission of a standard light source using an AUCOLOR calorimeter (produced by Kurabo Co., Ltd.)

(2) Transmittance of Total Light Ray: A film, 100 μm in thickness, was prepared, and according to JIS K7105, transmittance measurement with respect to the film was conducted using a hazemeter (produced by Nihon Denshoku Kogyo Co., Ltd. NDH-300A) (unit: %)

(3) Fluidity: According to ASTM D1238, Melt Flow Index(MFI) was measured under the condition of 190° C.×2.16 Kg. (unit: g/10 min)

(4) Yield Strength: According to ASTM D638, measurement was conducted. (unit: $Kgf/cm^2$)

(5) Breaking Strength: The same as above. (unit: $Kgf/cm^2$)

(6) Breaking Elongation: The same as above. (unit: %)

(7) Tensile Elastic Modulus: According to ASTM D790, measurement was conducted. (unit: $Kgf/cm^2$)

(8) Izod Impact Strength: According to ASTM D256, measurement was conducted using a plate type test piece with a cutting notch ⅛ inch in thickness. (unit: Kgf-cm/cm)

(9) Rockwell Hardness: According to ASTM D785, measurement was conducted. (unit: R scale)

(10) Heat-Transformation Temperature: According to ASTM D648, temperature was measured under 4.6 $Kgf/cm^2$ of the loading condition. (unit:° C.)

(11) Refractive Index: According to JIS K7142, measurement was conducted.

TABLE 1

|  | Comparative Example | | | | Example | | |
| --- | --- | --- | --- | --- | --- | --- | --- |
|  | 1 | 2 | 3 | 4 | 1 | 2 | 3 |
| (Composition (Wt %)) | | | | | | | |
| Component A | 100 | 95 | 90 | 90 | 95 | 90 | 85 |
| Component B | | | | | | | |
| X-type | | 5 | 10 | | | | |
| Y-type | | | | 10 | | | |
| Z-type | | 5 | 10 | 15 | | | |
| (Physical Property) | | | | | | | |
| L* | 76.04 | 71.75 | 70.31 | 28.51 | 75.02 | 75.74 | 75.11 |
| Hue | | | | | | | |
| a* | −0.68 | −2.36 | −3.64 | 4.77 | −1.54 | −3.19 | −4.09 |
| b* | 3.32 | 8.9 | 6.09 | 15.54 | 8.48 | 5.8 | 6.87 |
| Total Light Ray *1 | 92.08 | 86.44 | 84.42 | 32.93 | 90.38 | 90.79 | 90.48 |
| Fluidity | 0.89 | 0.60 | 0.63 | 0.74 | 0.61 | 0.52 | 0.49 |
| Yield Strength | 472 | 401 | 411 | 401 | 450 | 420 | 401 |
| Breaking Strength | 270 | 279 | 289 | 346 | 273 | 286 | 295 |
| Breaking Elongation | 98.7 | 124 | 112 | 289 | 172 | 187 | 217 |
| Tensile Elastic *2 | 3827 | 3521 | 3613 | 3228 | 3660 | 3404 | 3249 |
| Izod Impact *3 | 5.1 | 6.1 | 6.2 | 6.8 | 8.8 | 11 | 14 |

TABLE 1-continued

| | Comparative Example | | | | Example | | |
|---|---|---|---|---|---|---|---|
| | 1 | 2 | 3 | 4 | 1 | 2 | 3 |
| Rockwell Hardness | 98.9 | 90.0 | 89.1 | 81.3 | 97.7 | 93.3 | 90.7 |
| Heat Trans *4 | 70.2 | 69.0 | 68.0 | 69.2 | 70.0 | 69.7 | 68.8 |

TABLE 2

| | Component A | Component B | | |
|---|---|---|---|---|
| | | X-type | Y-type | Z-type |
| Refractive Index | 1.568 | 1.569 | 1.545 | 1.567 |
| Styrene/Butadiene *5 | | 70/30 | 40/60 | 70/30 |
| Epoxy Equivalent | | *7 | 500 | 750 |
| Difference *6 | | 0.001 | 0.023 | 0.001 |

NOTE:
In the above Table 1 and 2, the abbreviated marks *1 to *7 are restored to read as in the following parentheses. *1 (Transmittance of Total Light Ray); *2 (Tensile Elastic Modulus); *3 (Izod Impact Strength); *4 (Heat Transformation Temperature); *5 (Weight Ratio of Styrene/Butadiene); *6 [Difference of Refractive Index (Component A - Component B)]; *7 Non-Epoxidation Compound).

As described hereinbefore, the moldings prepared by the non-crystalline polyester resin composition according to the present invention have an excellent transparency, since the difference of refractive index between the Component A and Component B, constituting the resin composition, is small and thus, transparency of the Component A can be maintained. Moreover, impact strength of the moldings is greatly enhanced, as evident in the measurement result of Izod Impact Strength shown in Examples.

Further, the non-crystalline polyester resin composition having an excellent fluidity, in case when the composition is molded, can be obtained, and it is understood that all kinds of physical properties show balanced values.

Consequently, the present invention provides a non-crystalline polyester resin composition which can give a high transparency and impact resistance to the moldings thereof used in various fields. That is, the composition according to the present invention has a very useful quality in the fields of automobile parts, electronic machinery and tools, office-work appliances, or package for medical appliance parts, various protective covers, display sheets, indoor partitions, miscellaneous goods and the like, and the composition has a big industrial importance accordingly.

What is claimed is:

1. A non-crystalline polyester resin composition which comprises 50 to 99% by weight of a non-crystalline polyester resin (component A) and 1 to 50% by weight of an epoxy-modified block copolymer (component B), total amount of the components A and B being 100, component B being obtained by epoxidation of a block copolymer (B3) comprising a polymer block (B1) containing mainly a unit based on a vinyl aromatic compound and a polymer block (B2) containing mainly a unit based on a conjugated diene compound, an epoxy equivalent of the component B being in the range of 400 to 7,500, and an absolute difference-value of the refractive index between the components A and B being 0.008 or less.

2. The non-crystalline polyester resin composition according to claim 1 wherein the component B is an epoxy-modification of a hydrogenated block copolymer obtained by epoxidation of a hydrogenated block copolymer, the hydrogenated block copolymer being a partially hydrogenated block copolymer of the block copolymer (B3).

3. The non-crystalline polyester resin composition according to claim 1 wherein the component B is a mixture of an epoxy-modification of a non-hydrogenated block copolymer obtained by epoxidation of the non-hydrogenated block copolymer (B3) and an epoxy-modification of the hydrogenated block copolymer.

4. The non-crystalline polyester resin composition according to claim 1 wherein at least one part of the vinyl aromatic compound contained in the component B is styrene and an amount of styrene contained in the component B is in the range of 60 to 90% by weight.

5. The non-crystalline polyester resin composition according to claim 1 wherein the non-crystalline polyester resin (component A) is a resin obtained by esterification of a dicarboxylic acid component with a diol component.

6. The non-crystalline polyester resin composition according to claim 5 wherein the resin obtained by esterification is any one of (1) a copolyester resin wherein two or more kinds of compounds are used in at least one component of the dicarboxylic acid component and the diol component, (2) a mixed polyester resin wherein one kind of a homopolyester resin and the above-mentioned copolyester resin (1) are used, and (3) a mixed polyester resin wherein two or more kinds of the above-mentioned homopolyester resin are used.

7. The non-crystalline polyester resin composition according to claim 5 wherein the dicarboxylic acid component is a terephthalic acid.

8. The non-crystalline polyester resin composition according to claim 5 wherein the diol component is ethylene glycol.

9. The non-crystalline polyester resin composition according to claim 5 wherein the non-crystalline polyester resin is determined by the fact that no definite peak of the melting point is recognized using DSC measurement in accordance with JIS K7121.

* * * * *